(12) United States Patent
Akin et al.

(10) Patent No.: US 9,756,312 B2
(45) Date of Patent: Sep. 5, 2017

(54) HARDWARE-ORIENTED DYNAMICALLY ADAPTIVE DISPARITY ESTIMATION ALGORITHM AND ITS REAL-TIME HARDWARE

(71) Applicant: ECOLE POLYTECHNIQUE FEDERALE DE LAUSANNE (EPFL), Lausanne (CH)

(72) Inventors: Abdulkadir Akin, Ecublens (CH); Yusuf Leblebici, Lutry (CH); Alexandre Schmid, Sion (CH); Ipek Baz, Istanbul (TR); Irem Boybat, Ecublens (CH); Huseyin Baris Atakan, Zürich (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 296 days.

(21) Appl. No.: 14/267,140

(22) Filed: May 1, 2014

(65) Prior Publication Data
US 2015/0319419 A1    Nov. 5, 2015

(51) Int. Cl.
| | | |
|---|---|---|
| H04N 13/02 | (2006.01) | |
| G06T 19/20 | (2011.01) | |
| G06T 1/20 | (2006.01) | |
| G06T 7/00 | (2017.01) | |
| H04N 13/00 | (2006.01) | |

(52) U.S. Cl.
CPC .......... *H04N 13/0239* (2013.01); *G06T 1/20* (2013.01); *G06T 7/97* (2017.01); *H04N 13/0207* (2013.01); *G06T 2207/10012* (2013.01); *G06T 2207/10021* (2013.01); *H04N 2013/0081* (2013.01)

(58) Field of Classification Search
CPC .................................................. H04N 13/0207
USPC ........................................................... 348/49
See application file for complete search history.

(56) References Cited

U.S. PATENT DOCUMENTS

| | | |
|---|---|---|
| 5,768,404 A | 6/1998 | Morimura et al. |
| 2002/0012459 A1 | 1/2002 | Oh |
| 2006/0050338 A1 | 3/2006 | Hattori |
| 2010/0208994 A1 | 8/2010 | Yao et al. |
| 2010/0328427 A1 | 12/2010 | Sakano et al. |
| 2011/0176722 A1 | 7/2011 | Sizintsev et al. |
| 2011/0188736 A1 | 8/2011 | Xu |
| 2011/0285701 A1 | 11/2011 | Chen et al. |

(Continued)

FOREIGN PATENT DOCUMENTS

| | | |
|---|---|---|
| DE | 198 10 014 | 9/1999 |
| EP | 1 635 293 | 3/2006 |

(Continued)

*Primary Examiner* — Hee-Yong Kim
(74) *Attorney, Agent, or Firm* — The Law Office of Joseph L. Felber

(57) ABSTRACT

A real-time stereo camera disparity estimation device comprises input means arranged to input measured data corresponding to rows of left and right images; a plurality of on-chip memories arranged to buffer the input measured data; a vertical rotator hardware module configured to align the rows of left and right images in a same column; a reconfigurable data allocation hardware module; a reconfigurable computation of metrics hardware module; and an adaptive disparity selection hardware module configured to select disparity values with the minimum matching costs.

24 Claims, 9 Drawing Sheets

(56) References Cited

U.S. PATENT DOCUMENTS

Figures 1, 2:
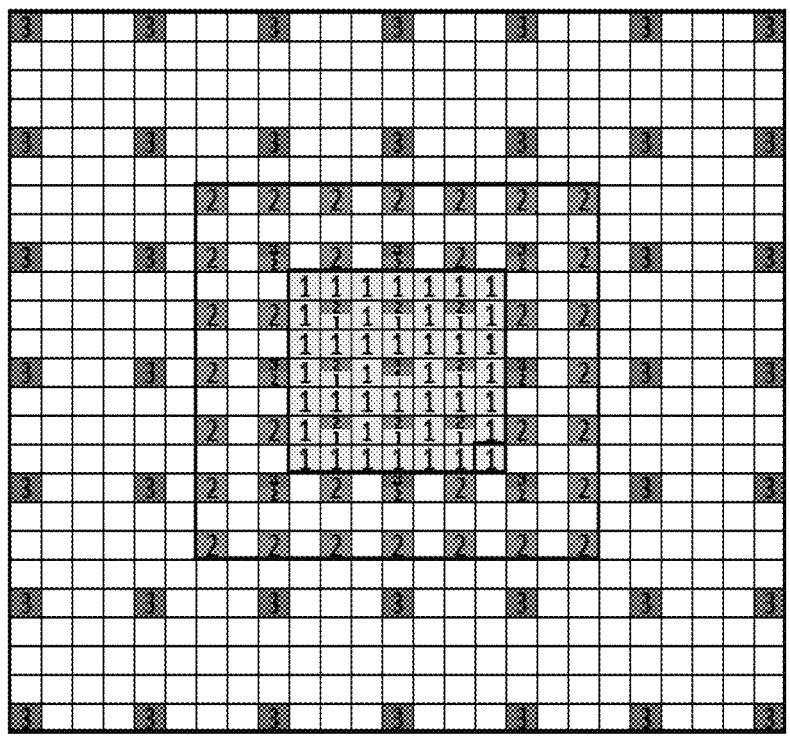

| | | |
|---|---|---|
| 2012/0249747 A1 | 10/2012 | Aviv et al. |
| 2012/0262543 A1 | 10/2012 | Lee et al. |
| 2013/0058564 A1 | 3/2013 | Ostermann et al. |
| 2013/0089269 A1 | 4/2013 | Barnum et al. |
| 2013/0113881 A1 | 5/2013 | Barnum |
| 2013/0136338 A1 | 5/2013 | Asente et al. |
| 2013/0136339 A1 | 5/2013 | Moon et al. |
| 2013/0155050 A1 | 6/2013 | Rastogi et al. |
| 2013/0266211 A1 | 10/2013 | Tippetts et al. |
| 2014/0002605 A1 | 1/2014 | Liao et al. |
| 2014/0003704 A1 | 1/2014 | Liao et al. |
| 2014/0334715 A1* | 11/2014 | Wen .................. G06T 19/20 382/154 |

FOREIGN PATENT DOCUMENTS

| | | |
|---|---|---|
| EP | 2 511 875 | 10/2012 |
| EP | 2 528 036 | 11/2012 |
| KR | 10-0793076 | 1/2008 |
| KR | 10-0795974 | 1/2008 |
| WO | 98/47061 | 10/1998 |
| WO | 98/47097 | 10/1998 |
| WO | 00/27131 | 5/2000 |
| WO | 2004/039086 | 5/2004 |
| WO | 2009/061305 | 5/2009 |
| WO | 2012/037075 | 3/2012 |
| WO | 2012/100225 | 7/2012 |
| WO | 2012/177166 | 12/2012 |
| WO | 2013/079602 | 6/2013 |
| WO | 2013/0100790 | 7/2013 |
| WO | 2013/173106 | 11/2013 |
| WO | 2014/001407 | 1/2014 |

\* cited by examiner

Census, *Shape* and Windows for searched candidates preliminary computed Census, *Shape* and 9 Windows for a block

Table 1

| $tr_{7x7}$ | $tr_{13x13}$ | $ap_{7x7}$ | $ap_{13x13}$ | $ap_{25x25}$ | $threshold_w$ |
|---|---|---|---|---|---|
| 5 | 2 | 32 | 16 | 4 | 8 |

Table 2

| Algorithm | Error Rate (%) | | | | |
|---|---|---|---|---|---|
| | Tsukuba 288 x384 | Venus 383 x484 | Aloe 1110 x1282 | Art 1110 x1390 | Clothes 1110 x1300 |
| Chang[15] | 4.15 | 0.56 | 3.75 | 12.80 | 2.97 |
| Ttofis[20] | 13.21 | 4.56 | 8.88 | 32.18 | 7.67 |
| Greis.[21] | 12.42 | 4.14 | 8.65 | 23.46 | 5.30 |
| Georg.[19] | 12.38 | 15.20 | 6.97 | 23.75 | 9.15 |
| Census7 | 26.05 | 30.80 | 20.36 | 45.39 | 21.80 |
| Census13 | 18.19 | 18.83 | 11.21 | 31.65 | 9.36 |
| Census25 | 15.94 | 15.38 | 10.41 | 29.66 | 7.16 |
| BWSAD7 | 12.19 | 19.45 | 8.31 | 34.03 | 13.33 |
| BWSAD13 | 11.23 | 15.16 | 7.13 | 28.57 | 9.27 |
| BWSAD25 | 10.43 | 11.12 | 6.74 | 24.74 | 6.28 |
| FW-DE7 | 9.53 | 12.59 | 5.38 | 20.87 | 5.39 |
| FW-DE13 | 7.90 | 6.82 | 4.81 | 16.97 | 3.16 |
| FW-DE25 | 8.03 | 5.66 | 5.16 | 18.12 | 3.87 |
| AWDE | 7.64 | 5.33 | 4.94 | 16.33 | 2.89 |
| AWDE-HC | 7.47 | 4.73 | 4.92 | 16.17 | 2.95 |
| AWDE-IR | 6.53 | 5.01 | 4.30 | 14.47 | 2.94 |

Table 3

| Hardware | Technology | Image Resolution | DFF Consumption | LUT Consumption | Disparity Range | fps | Clock Speed (MHz) |
|---|---|---|---|---|---|---|---|
| Chang [15] | ASIC-90nm | 352×288 | 562k Gates | | 64 | 42 | 95 |
| Ttofis [20] | Virtex-5 | 1280×1024 | 31k | 47k | 120 | 50 | 100 |
| Greisen [21] | Stratix-III | 1920×1080 | 26k | 54k | 256 | 30 | 130 |
| Georgoulas [19] | Stratix-IV | 800×600 | 15k | 146k | 80 | 550 | 511 |
| Proposed (AWDE) | Virtex -5 | 1024×768 640×480 352×288 | 35k | 40k | 128 64 64 | 60 221 670 | 190 |
| Proposed (AWDE-IR) | Virtex -5 | 1024×768 640×480 352×288 | 43k | 48k | 128 64 64 | 60 221 670 | 190 |

Fig. 14

HARDWARE-ORIENTED DYNAMICALLY ADAPTIVE DISPARITY ESTIMATION ALGORITHM AND ITS REAL-TIME HARDWARE

BACKGROUND OF THE INVENTION

Depth estimation is an algorithmic step in a variety of applications such as autonomous navigation, robot and driving systems [1], 3D geographic information systems [2], object detection and tracking [3], medical imaging [4], computer games and advanced graphic applications [5], 3D holography [6], 3D television [7], multiview coding for stereoscopic video compression [8], and disparity-based rendering [9]. These applications require high accuracy and speed performances for depth estimation.

Depth estimation can be performed by exploiting three main techniques: time-of-flight (TOF) camera, LIDAR sensor and stereo camera. A TOF camera easily measures the distance between the object and camera using a sensor, circumventing the need of intricate digital image processing hardware [10]. However, it does not provide efficient results when the distance between the object and camera is high. Moreover, the resolution of TOF cameras is usually very low (200×200) [10] when it is compared to the Full HD display standard (1920×1080). Furthermore, their commercial price is much higher than the CMOS and CCD cameras. LIDAR sensors compute the depth by using laser scanning mechanisms but they are also very expensive compared to CMOS and CCD cameras. Due to laser scanning hardware, LIDAR sensors are heavy and bulky devices. Therefore, they can be used mainly for static images. Consequently, in order to compute depth map, the majority of research focus on extracting the disparity information using two or more synchronized images taken from different viewpoints, using CMOS or CCD cameras [11].

Many Disparity Estimation (DE) algorithms have been developed with the goal to provide high-quality disparity results. These are ranked with respect to their performance in the evaluation of Middlebury benchmarks [11]. Although top-performer algorithms provide impressive visual and quantitative results [12]-[14], their implementations in real-time High Resolution (HR) stereo video are challenging due to their complex multi-step refinement processes or their global processing requirements that demand huge memory size and bandwidth. For example, the AD-Census algorithm [12], currently the top published performer, provides successful results that are very close to the ground truths. However, this algorithm consists of multi disparity enhancement sub-algorithms, and implementing them into a midrange FPGA is very challenging both in terms of hardware resource and memory limitations.

Various hardware architectures that are presented in literature provide real-time DE [15]-[21]. Some implemented hardware architectures only target CIF or VGA video [15]-[18]. The hardware proposed in [15] only claims real-time for CIF video. It uses the Census transform [22] and currently provides the highest quality disparity results compared to real-time hardware implementations in ASICs and FPGAs. The hardware presented in [15] uses low complexity Mini-Census method to determine the matching cost, and aggregates the Hamming costs following the method in [12]. Due to high complexity cost aggregation, the hardware proposed in [15] requires high memory bandwidth and intense hardware resource utilization, even for Low Resolution (LR) video. Therefore, it is able to reach less than 3 frames per second (fps) when its performance is scaled to 1024×768 video resolution and 128 pixel disparity range.

Real-time DE for HR images offers some crucial advantages compared to low resolution DE. First, processing HR stereo images increases the disparity map resolution which improves the quality of the object definition. Second, DE for HR stereo images is able to define the disparity with sub-pixel efficiency compared to the DE for LR image. Therefore, the DE for HR provides more precise depth measurement than the DE for LR. Third, disparity values between 0-2 can be considered as background for LR images. In HR such disparities are defined within a larger disparity range; thus, the depth of far objects can be established more precisely.

Despite the advantages of HR disparity estimation, the use of HR stereo images brings some challenges. Disparity estimation needs to be assigned pixel by pixel for high-quality disparity estimation. Pixel-wise operations cause a sharp increase in computational complexity when the DE targets HR stereo video. Moreover, DE for HR stereo images requires stereo matching checks with larger number of candidate pixels than the disparity estimation for LR images. The large amount of candidates increases the challenge to reach real-time performance for HR images. Furthermore, high-quality disparity estimation may require multiple reads of input images or intermediate results, which poses severe demands on off-chip and on-chip memory size and bandwidth especially for HR images.

The systems proposed in [19]-[21] claim to reach real-time for HR video. Still, their quality results in terms of the HR benchmarks given in [11] are not provided. [19] claims to reach 550 fps for 80 pixel disparity range at a 800×600 video resolution, but it requires extremely large hardware resources. A simple edge-directed method presented in [20] reaches 50 fps at a 1280×1024 video resolution and 120 pixel disparity range, but does not provide satisfactory DE results due to a low-complexity architecture. In [21], a hierarchical structure with respect to image resolution is presented to reach 30 fps at a 1920×1080 video resolution and 256 pixel disparity range, but it does not provide high-quality DE for HR.

In order to reduce the computational complexity of DE, Patent Publication [27] utilizes Census transform by sampling pixels in a searched window and succeeds parallelism using multiple FPGAs. However, it does not present dynamically adaptive window size selection algorithm and hardware, and it does not benefit from the adaptive and hybrid cost computation. In order to adapt the disparity estimation process to the local texture on the image, Patent Publication [28] utilizes adaptive size cost aggregation window method. Patent Publication [28] does not utilize dynamic window size for stereo matching during the cost computation, but it utilizes adaptive window size while aggregating cost values. Cost aggregation method requires large computation load and local memory. Therefore, this technique is not used in the algorithm and implementation that are presented in this patent, instead matching window size is adaptively changed.

SUMMARY OF THE INVENTION

The computational complexity of disparity estimation algorithms and the need of large size and bandwidth for the external and internal memory make the real-time processing of disparity estimation challenging, especially for High Resolution (HR) images. This patent proposes a hardware-oriented adaptive window size disparity estimation (AWDE)

algorithm and its real-time reconfigurable hardware implementation that targets HR video with high quality disparity results. Moreover, an enhanced version of the AWDE implementation that uses iterative refinement (AWDE-IR) is presented. The AWDE and AWDE-IR algorithms dynamically adapt the window size considering the local texture of the image to increase the disparity estimation quality. The proposed reconfigurable hardware architectures of the AWDE and AWDE-IR algorithms enable handling 60 frames per second on a Virtex-5 FPGA at a 1024×768 XGA video resolution for a 128 pixel disparity range. A description of AWDE, AWDE-IR and its real-time hardware implementation have been presented in inventors own publications [23]-[24].

In the present invention, we present a hardware-oriented adaptive window size disparity estimation (AWDE) algorithm and its real-time reconfigurable hardware implementation to process HR stereo video with high-quality disparity estimation results. The proposed enhanced AWDE algorithm that utilizes Iterative Refinement (AWDE-IR) is implemented in hardware and its implementation details are presented. Moreover, the algorithmic comparison with the results of different algorithms is presented.

The proposed AWDE algorithm combines the strengths of the Census Transform and the Binary Window SAD (BW-SAD) [25] methods, thus enables an efficient hybrid solution for the hardware implementation. Although the low-complexity Census method can determine the disparity of the pixels where the image has a texture, mismatches are observed in textureless regions. Moreover, due to a 1-bit representation of neighboring pixels, the Census easily selects wrong disparity results. In order to correct these mismatches, our proposed AWDE algorithm uses the support of the BW-SAD, instead of using the complex cost aggregation method [12], [15].

The benefit of using different window sizes for different texture features on the image is observed from the DE results in [25]-[26]. The selection of a large window size improves the algorithm performance in textureless regions while requiring higher computational load. However, the usage of small window sizes provides better disparity results where the image has a texture. Moreover, the use of BW-SAD provides better disparity estimation results than the SAD for the depth discontinuities [25]. In [26], the efficiency of using adaptive window sizes is explained using algorithmic results. However [26] does not present hardware implementation of the adaptive window selection, and it does not benefit from the adaptive combination of Census and BW-SAD methods. The hardware presented in [25] is not able to dynamically change the window size, since it requires to re-synthesize the hardware for using different window sizes. In addition, the hardware presented in [25] does not benefit from the Census cost metric.

The proposed hardware provides dynamic and static configurability to have satisfactory disparity estimation quality for the images with different contents. It provides dynamic reconfigurability to switch between window sizes of 7×7, 13×13 and 25×25 pixels in run-time to adapt to the texture of the image.

The proposed dynamic reconfigurability provides better DE results than existing real-time DE hardware implementations for HR images [19]-[21] for the tested HR benchmarks. The proposed hardware architectures for AWDE and AWDE-IR provides 60 frames per second at a 1024×768 XGA video resolution for 128 pixel disparity range. The AWDE and AWDE-IR algorithms and their reconfigurable hardware can be used in consumer electronics products where high-quality real-time disparity estimation is needed for HR video.

Accordingly, in a first aspect the invention provides a real-time stereo camera disparity estimation device comprising input means arranged to input measured data corresponding to rows of left and right images; a plurality of on-chip memories arranged to buffer the input measured data; a vertical rotator hardware module configured to align the rows of left and right images in a same column; a reconfigurable data allocation hardware module; a reconfigurable computation of metrics hardware module; and an adaptive disparity selection hardware module configured to select disparity values with the minimum matching costs.

In a preferred embodiment the device further comprises an iterative disparity refinement hardware module configured to iteratively refine the disparity values.

In a further preferred embodiment of the device, the reconfigurable data allocation hardware module is configured to create variable window sizes to adapt the window size to the local texture on the image.

In a further preferred embodiment of the device, the reconfigurable computation of metrics hardware module comprises plurality of processing elements for multiple processed pixels in a two dimensional block to compute their stereo matching costs for the candidate disparities in parallel.

In a further preferred embodiment of the device, each of the plurality of on-chip memories comprises: dual-ports configured to write and read concurrently; a connection of read address ports to the same read address request of the processing elements to allow processing elements to read multiple rows and the same column of the image in parallel; and YCbCr or RGB data for the pixels.

In a further preferred embodiment of the device, pixels of different rows are stored in separate block RAMs to be able to access multiple pixels in the same column in parallel.

In a further preferred embodiment of the device, the data in the block RAMs are overwritten by the new rows of the image after they are processed.

In a further preferred embodiment of the device, the vertical rotator is further configured to rotate either Y, Cb or Cr, either R, G or B to make disparity estimation in any of the selected pixel data channel; and to rotate and align either left image pixels or right image pixels.

In a further preferred embodiment of the device, the reconfigurable data allocation module to create variable window sizes comprises, a flip-flop array configured to store and shift aligned outputs of the vertical rotator; wires connected to the flip-flops array arranged to sample the pixels while pixels are flowing inside the flip-flops array; a plurality of first sampling schemes to provide the variable window sizes; a plurality of second sampling schemes to provide constant number of contributing pixels in the variable window sizes to provide constant computational load for the variable window sizes; and a plurality of multiplexers configured to select the windows to be used in disparity estimation process of multiple pixels in a block according to the selected window size.

In a further preferred embodiment of the device, the selection of window size is determined depending on the variance of the neighboring pixels for variable window sizes.

In a further preferred embodiment of the device, a same selected window size is applied to the multiple searched pixels in a block.

In a further preferred embodiment of the device, for every searched block of pixels, window size is dynamically re-determined.

In a further preferred embodiment of the device, the plurality of processing elements hardware are configured for a computation of metrics and comprises, a plurality of census, Hamming, SAD and BW-SAD cost computation modules for the concurrent and independent disparity search of the multiple pixels in the two dimensional block, and selection means configured for a configurability through selection either of SAD or BW-SAD cost computations.

In a further preferred embodiment of the device, the plurality of processing elements hardware comprises, SAD and BW-SAD computations for the sampled pixels in the searched block to reduce the overall computational complexity; interpolation of SAD and BW-SAD values of the sampled pixels in the block to compute and estimate the SAD and BW-SAD values of all the remaining pixels in the searched block for which SAD and BW-SAD are not computed; and Hamming computations for all the pixels in the searched block.

In a further preferred embodiment of the device, the adaptive disparity selection hardware module for the selection of the disparities with the minimum matching costs comprises a multiplier to normalize the hamming cost using adaptive penalties; and means for performing addition of multiplied hamming value with the SAD result to compute hybrid cost.

In a further preferred embodiment of the device, the adaptive penalties are in the order of two to simplify the implementation of multipliers with shifters.

In a further preferred embodiment of the device, small penalty values are used for small window size, and big penalty values are used for big window size.

In a further preferred embodiment of the device, the disparity refinement hardware module to refine the disparity values comprises a flip-flop array to store and shift the disparity results; and at least a highest frequency selection hardware module configured to determine the most frequent disparity values to replace the processed disparity values with the most frequent ones.

In a further preferred embodiment of the device, the highest frequency selection hardware module is configured to determine the most frequent disparity values and refine the disparities using the color similarity of the neighboring pixels.

In a further preferred embodiment of the device, multiple rows are refined in parallel using multiple hardware modules to determine the most frequent disparity values.

In a further preferred embodiment of the device, the disparity results are iteratively refined.

In a further preferred embodiment of the device, the disparity results are iteratively refined by processing multiple consecutive columns using multiple highest frequency selection hardware modules.

In a further preferred embodiment of the device, the refined disparity values are written back to the disparity results array to iteratively use refined disparity values for the further refinements.

In a further preferred embodiment of the device, the final shifted disparity values at the end of the disparity results array are used as the output of the disparity estimation hardware.

In a second aspect, the invention provides an iterative disparity refinement hardware module to refine disparity values which comprises a flip-flop array to store and shift the disparity results; and a highest frequency selection hardware module configured to determine the most frequent disparity value to replace the processed disparity value with the most frequent one.

In a further preferred embodiment of the iterative disparity refinement hardware module, the highest frequency selection hardware module is configured to determine the most frequent disparity values and refine the disparities using the color similarity of the neighboring pixels.

In a further preferred embodiment of the iterative disparity refinement hardware module, multiple rows are refined in parallel using multiple hardware modules to determine the most frequent disparity values.

In a further preferred embodiment of the iterative disparity refinement hardware module, the disparity results are iteratively refined.

In a further preferred embodiment of the iterative disparity refinement hardware module, the disparity results are iteratively refined by processing multiple consecutive columns using multiple highest frequency selection hardware modules.

In a further preferred embodiment of the iterative disparity refinement hardware module, the refined disparity values are written back to the disparity results array to iteratively use refined disparity values for the further refinements.

In a further preferred embodiment of the iterative disparity refinement hardware module, the final shifted disparity values at the end of the disparity results array are used as the output of the disparity estimation hardware.

In a third aspect the invention provides a reconfigurable data allocation hardware module configured to create variable window sizes to adapt the window size to the local texture on the image comprising a flip-flop array configured to store and shift aligned outputs of the vertical rotator; wires connected to the flip-flops array arranged to sample the pixels while pixels are flowing inside the flip-flops array; a plurality of first sampling schemes to provide the variable window sizes; a plurality of second sampling schemes to provide constant number of contributing pixels in the variable window sizes to provide constant computational load for the variable window sizes; and a plurality of multiplexers configured to select the windows to be used in disparity estimation process of multiple pixels in a block according to the selected window size.

In a further preferred embodiment of the iterative disparity refinement hardware module, the selection of window size is determined depending on the variance of the neighboring pixels for variable window sizes.

In a further preferred embodiment of the iterative disparity refinement hardware module, a same selected window size is applied to the multiple searched pixels in a block.

In a further preferred embodiment of the iterative disparity refinement hardware module, for every searched block of pixels, window size is dynamically re-determined.

BRIEF DESCRIPTION OF THE DRAWINGS AND TABLES

Figure 3:
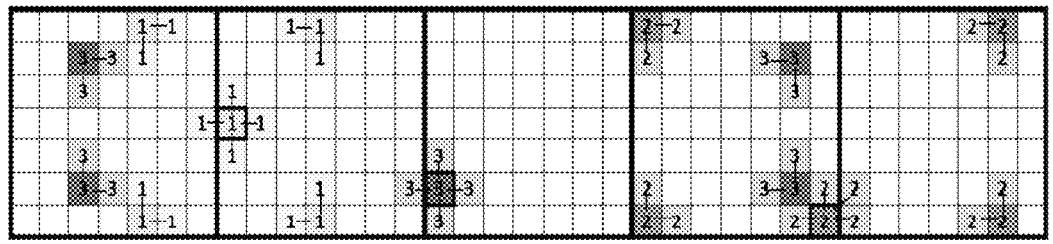
Figure 4:
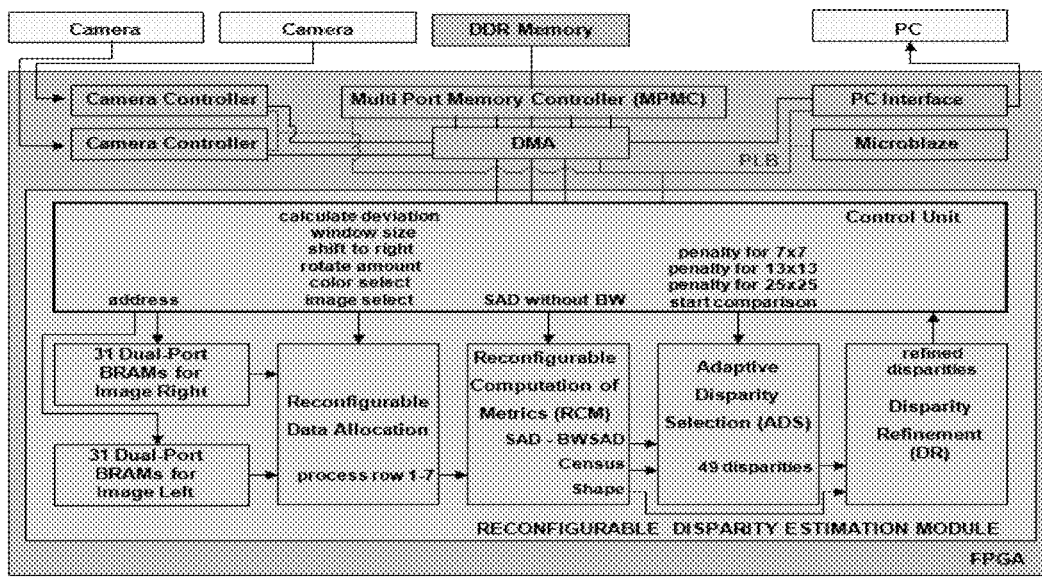
Figure 5:
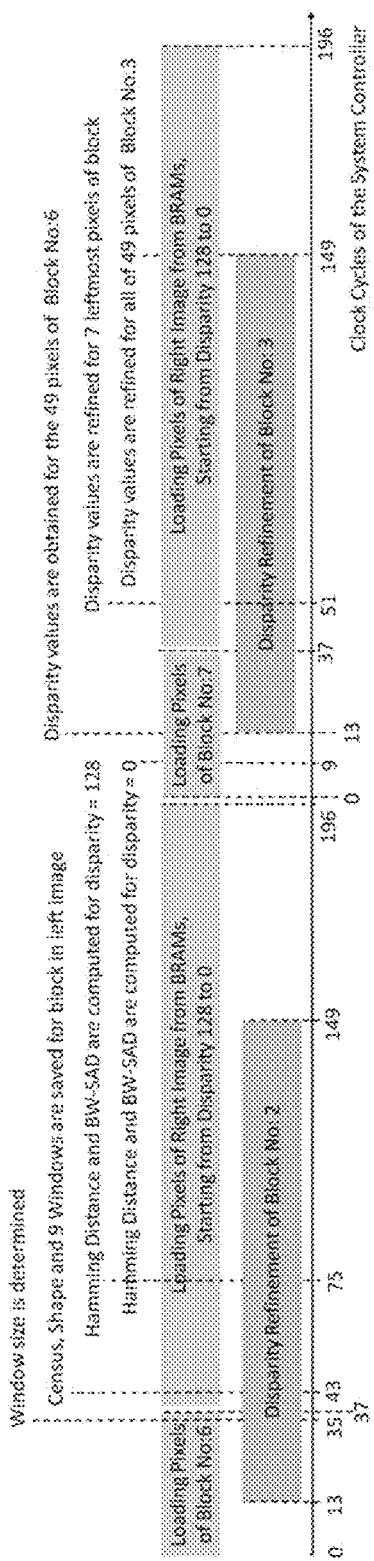
Figure 6:
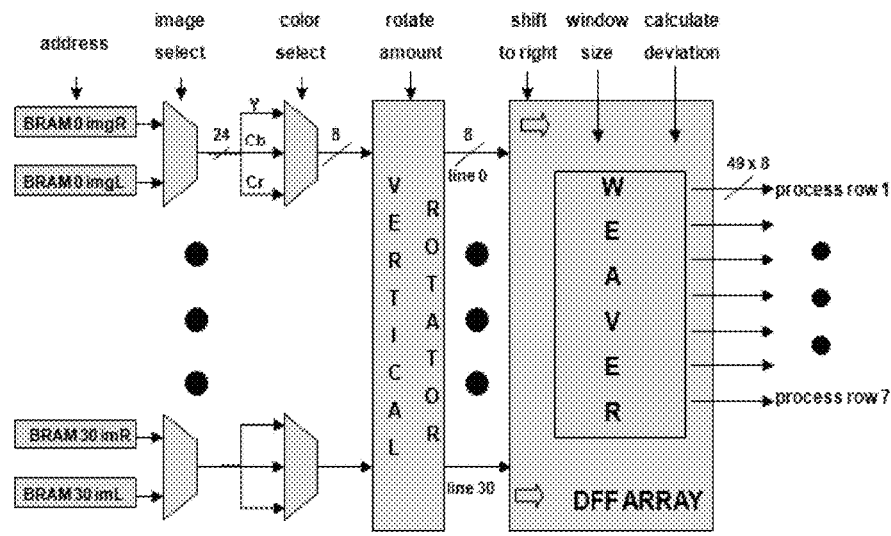
Figure 7:
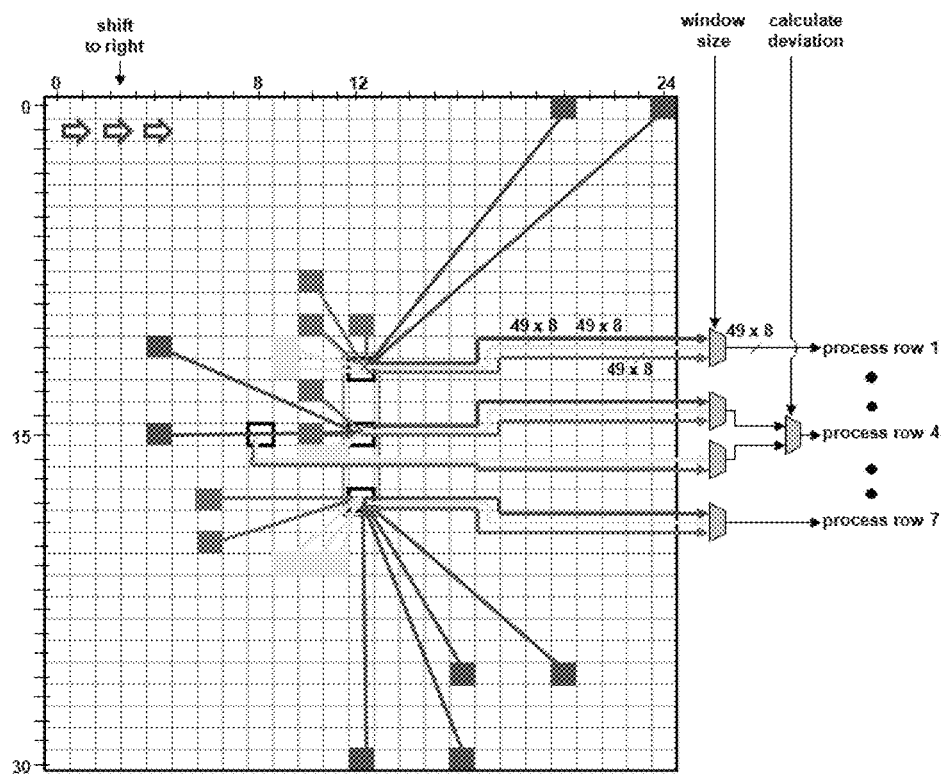
Figure 8:
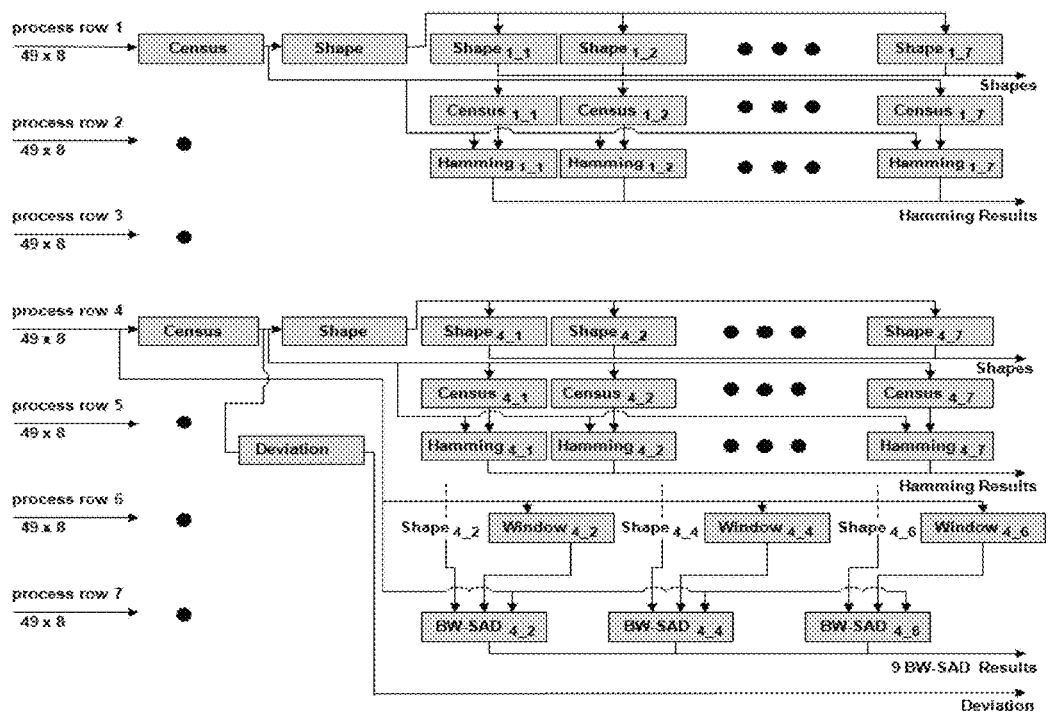
Figure 9:
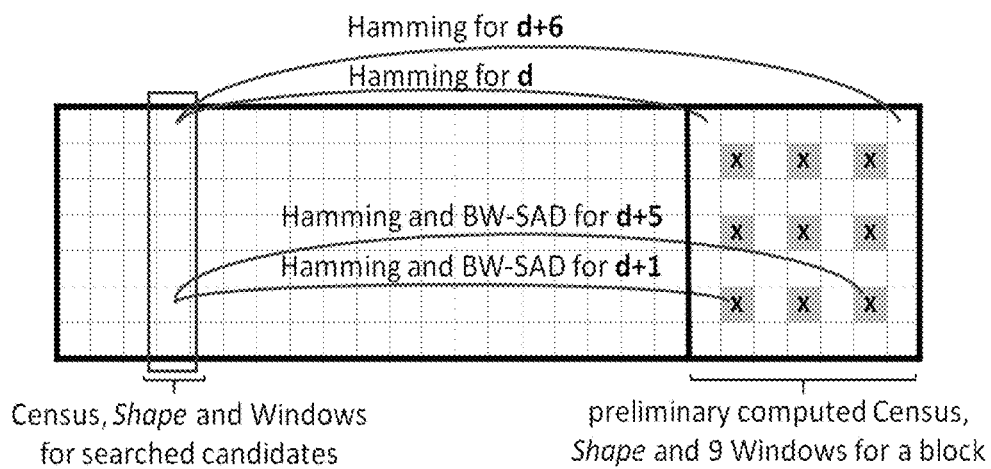
Figure 10:
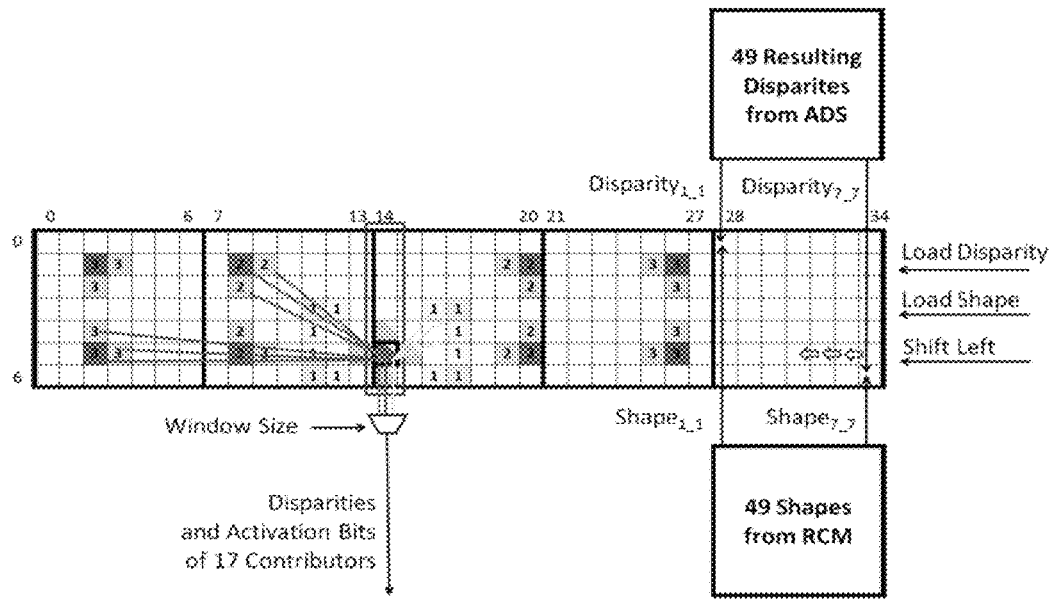
Figure 11:
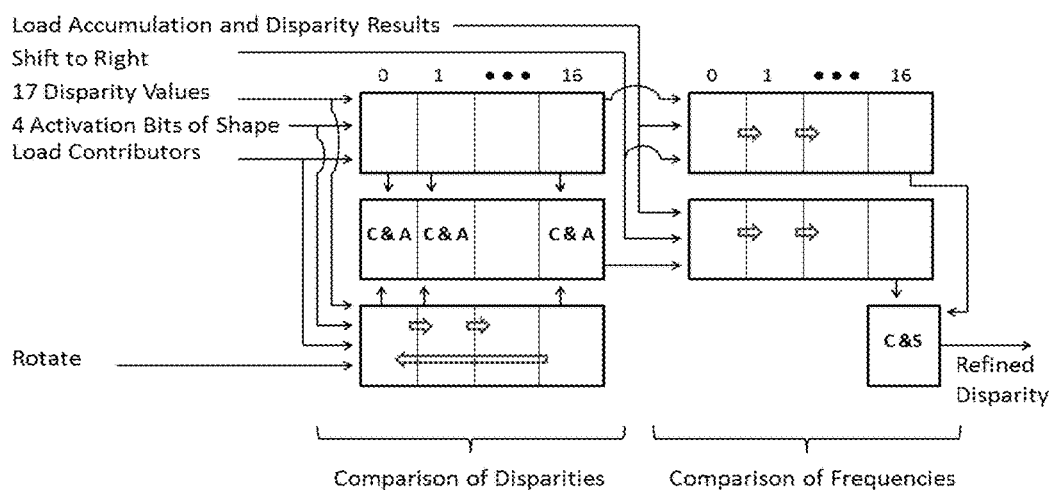
Figure 12:
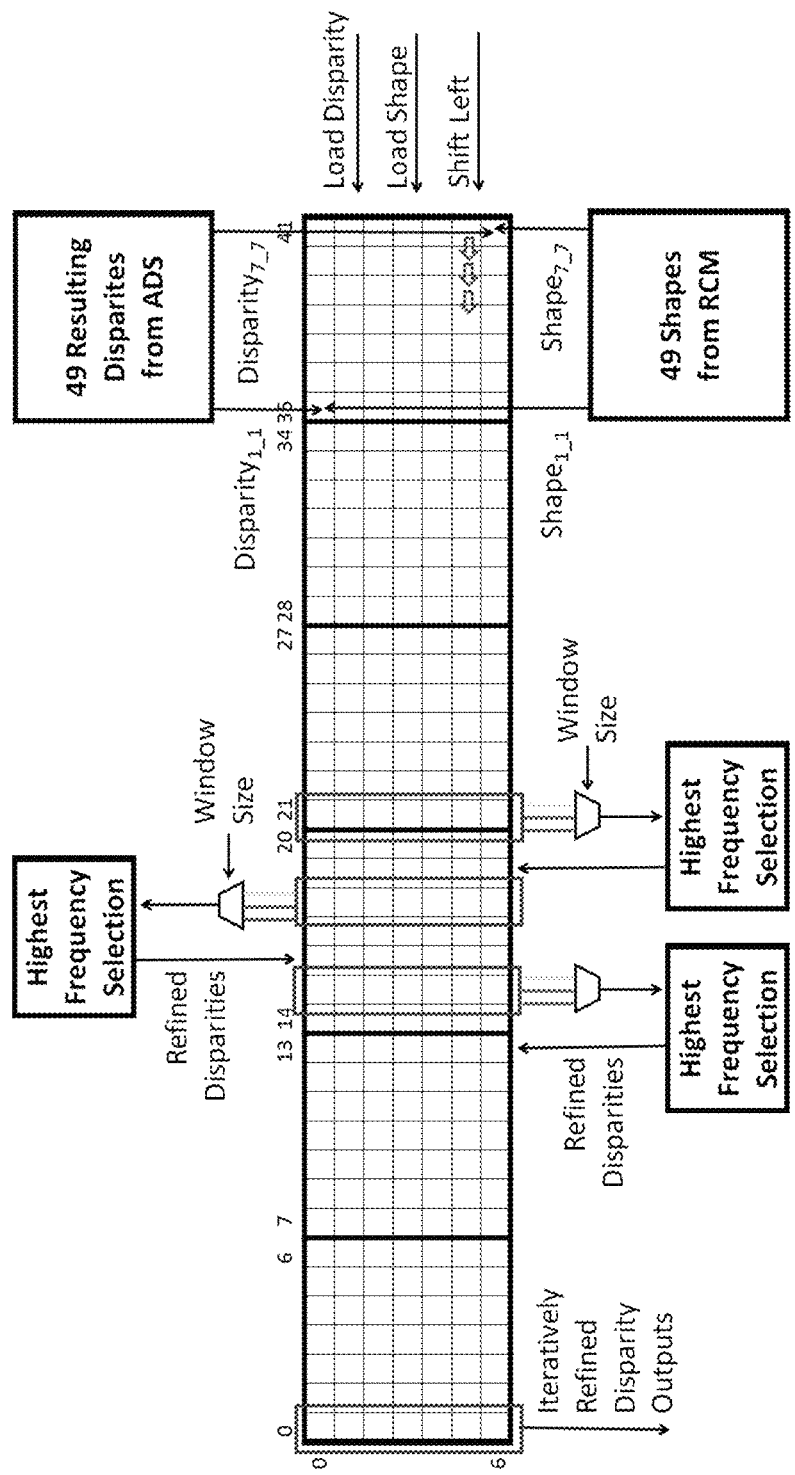
Figure 13:
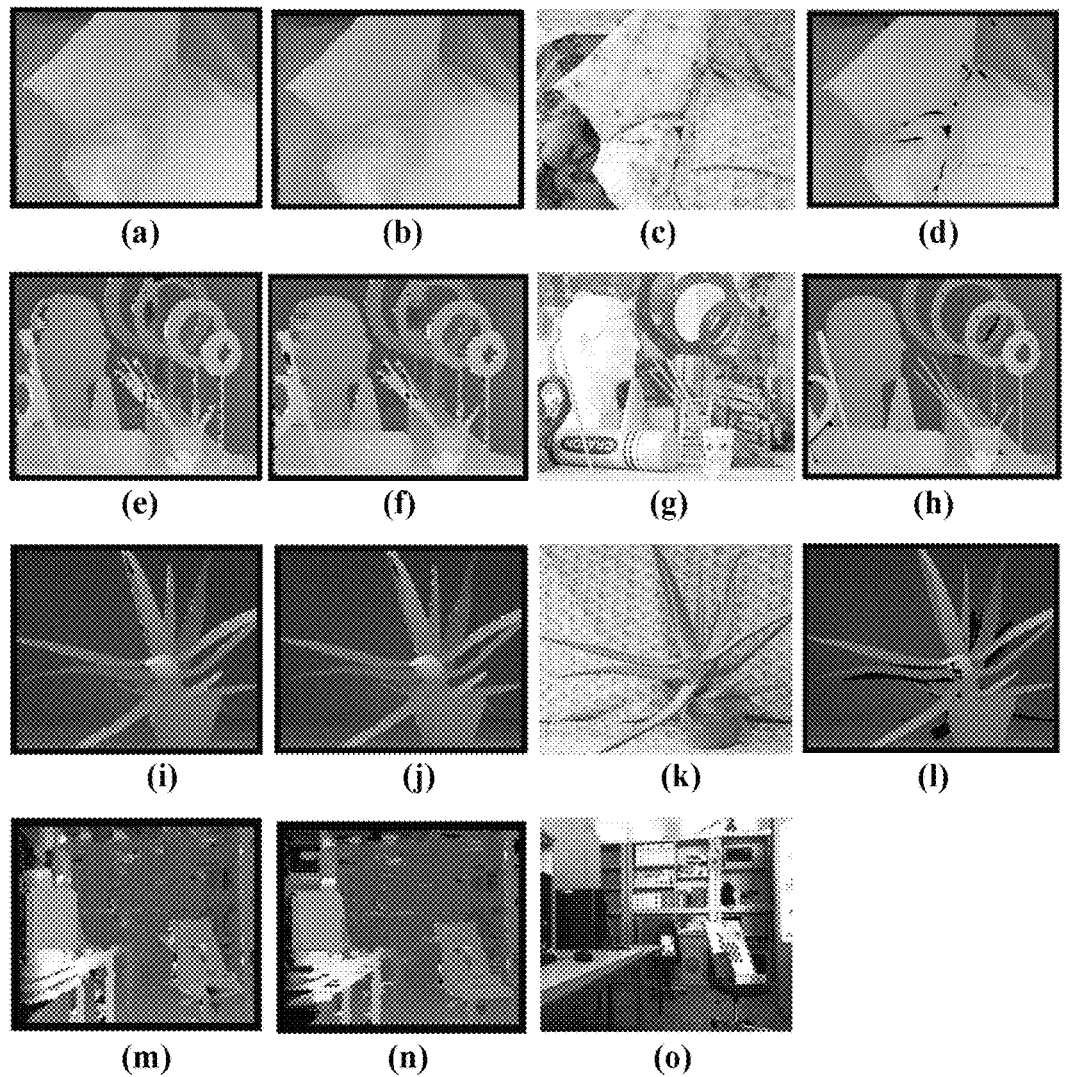

The invention will be better understood in light of the description of example embodiments and in view of the drawings, wherein FIG. 1 presents 9 selected pixels in a block for BW-SAD calculation. 49 pixels in a block are searched in parallel in hardware;

FIG. 2 presents 49 selected pixels of adaptive windows (yellow (1): 7×7, green (2): 13×13 and blue (3):25×25);

FIG. 3 presents examples for selecting 17 contributing pixels for 7×7, 13×13 and 25×25 window sizes during the disparity refinement process (yellow (1): 7×7, green (2): 13×13 and blue (3):25×25);

FIG. 4 presents top-Level Block Diagram of the System Architecture;

FIG. 5 presents system Timing Diagram;

FIG. 6 presents reconfigurable Data Allocation Module;

FIG. 7 presents DFF Array and the Weaver (yellow: 7×7, green: 13×13 and blue: 25×25);

FIG. 8 presents reconfigurable Computation of Metrics;

FIG. 9 presents processing Scheme ("x" indicates 9 selected pixels in a block for BW-SAD calculations);

FIG. 10 presents DR-Array of the Disparity Refinement Module (yellow (1): 7×7, green (2): 13×13 and blue (3): 25×25);

FIG. 11 presents processing element of the Disparity Refinement Module. The Highest Frequency Selection Module includes seven of these DR-PE elements;

FIG. 12 presents DR-Array of the Iterative Disparity Refinement Module (yellow line: 7×17 candidates for 7×7 window, green line: candidates for 13×13, and blue line: candidates for 25×25);

FIG. 13 presents visual disparity estimation results of AWDE and AWDE-IR algorithms for HR benchmarks. From left column to right column: DE result of AWDE, DE result of AWDE-IR, left image, ground truth. Black regions in the ground truths are not taken into account for the error computations as explained in [11]. Ground truth for the image (o) is not available. (a-d) Clothes, (e-h) Art, (i-l) Aloe and (m-o) LSM lab; and FIG. 14 presents Tables 1-3, which provide parameters of the AWDE, disparity estimation performance comparisons, and hardware performance comparisons, respectively.

DETAILED DESCRIPTION OF EMBODIMENTS OF THE INVENTION

The main focus of the AWDE algorithm is its compatibility with real-time hardware implementation while providing high-quality DE results for HR. The algorithm is designed to be efficiently parallelized to require minimal on-chip memory size and external memory bandwidth.

As a terminology, we use the term "block" to define the 49 pixels in the left image that are processed in parallel. The term "window" is used to define the 49 sampled neighboring pixels of any pixel in the right or left images with variable sizes of 7×7, 13×13 or 25×25. The pixels in the window are used to calculate the Census and BW-SAD cost metrics during the search process.

The algorithm consists of three main parts: window size determination, disparity voting, and disparity refinement. The parameters that are used in the AWDE algorithm are given in Table 1.

The window size of the 49 pixels in each block is adaptively determined according to the Mean Absolute Deviation (MAD) of the pixel in the center of the block with its neighbors. The formula of the MAD is presented in (1), where c is the center pixel location of the block and q is the pixel location in the neighborhood, $N_c$, of c. The center of the block is the pixel located at block (4, 4) in FIG. 1. The high MAD value is a sign of high texture content and the low MAD value is a sign of low texture content. Three different window sizes are used. As expressed in (2), a 7×7 window is used if the MAD of the center pixel is high, and a 25×25 window is used if the MAD is very low.

$$MAD_{ICI} = \frac{1}{11} \times \Sigma_{l \in I_1} iI_1(q) - I_1(c)1 \quad (1)$$

$$\text{window size} = \begin{cases} 7 \times 7 & \text{if } MAD(c) > tr_{7 \times 7} \\ 13 \times 13 & \text{else if } MAD(c) > tr_{13 \times 13} \\ 25 \times 25 & \text{else} \end{cases} \quad (2)$$

Error! Digit expected. As a general rule, increasing the window size increases the algorithm and hardware complexity [25]. As shown in FIG. 2, in our proposed algorithm, in order to provide constant hardware complexity over the three different window sizes, 49 neighbors are constantly sampled for different window sizes. "1", "2" and "3" indicate the 49 pixels used for the different window sizes 7×7, 13×13 and 25×25, respectively. If the sampling of 49 pixels in a window is not applied and all the pixels in a window are used during the matching process, an improvement in the disparity estimation quality can be obtained. The overhead of computational complexity for this high-complexity case and the degradation of the DE quality due to sampling are presented in Table 2.

A hybrid solution involving the Binary Window SAD and Census cost computation methods is presented to benefit from their combined advantages. The SAD is one of the most commonly used similarity metrics. The use of BW-SAD provides better results than using the SAD when there is disparity discontinuity since it combines shape information with the SAD [25]. However, the computational complexity of the BW-SAD is high, thus result of this metric is provided for nine of the 49 pixels in a block and they are linearly interpolated to find the BW-SAD values for the remaining 40 pixels in a block. The selected nine pixels for the computation of BW-SAD are shown in FIG. 1. The low complexity Census metric is computed for all of the 49 pixels of a block.

The formula expressing the BW-SAD for a pixel p=(x, y) is shown in (3) and (4). The BW-SAD is calculated over all pixels q of a neighborhood $N_p$, where the notation d is used to denote the disparity. The binary window, w, is used to accumulate absolute differences of the pixels, if they have an intensity value which is similar to the intensity value of the center of the window. The multiplication with w in (4) is implemented as reset signal for the resulting absolute differences (AD). In the rest of the patent, the term, "Shape" is indicated by w.

Depending on the texture of the image, the Census and the BW-SAD have different strengths and sensibility for the disparity calculation. To this purpose, a hybrid selection method is used to combine them. As shown in (5) and (6), an adaptive penalty (ap) that depends on the texture observed in the image is applied to the cost of the Hamming differences between the Census values. Subsequently, the disparity with the minimum Hybrid Cost (HC) is selected as the disparity of a searched pixel. 2's order penalty values are used to turn the multiplication operation into a shift operation. If there is a texture on the block, the BW-SAD difference between the candidate disparities needs to be more convincing to change the decision of Census, thus a higher penalty value is applied. If there is no texture on the block, a small penalty value is applied since the BW-SAD metric is more reliable than the decision of Census.

$$w = \begin{cases} 0 & \text{if } |I_L(q) - I_L(p)| > threshold_w, q \in N_p \\ 1 & \text{else} \end{cases} \quad (3)$$

$$BW\text{-}SAD(p, d) = \Sigma_{q \in N_p} |I_L(q) - I_R(q - d)| * w \quad (4)$$

$$HC(p, d) = BW\text{-}SAD(p, d) + hamming(p, d) \times ap \quad (5)$$

$$ap = \begin{cases} ap_{7 \times 7} & \text{if } \text{window size}(p) == 7 \times 7 \\ ap_{13 \times 13} & \text{else if } \text{window size}(p) == 13 \times 13 \\ ap_{25 \times 25} & \text{else if } \text{window size}(p) == 25 \times 25 \end{cases} \quad (6)$$

The proposed Disparity Refinement (DR) process assumes that neighboring pixels within the same Shape needs to have an identical disparity value, since they may belong to one unique object. In order to remove the faulty computations, the most frequent disparity value within the Shape is used.

As shown in FIG. 3, since the proposed hardware processes seven rows in parallel during the search process of a block, the DR process only takes the disparity of pixels in the processed seven rows. The DR process of each pixel is complemented with the disparities of 16 neighbor pixels and its own disparity value. Finally, the most frequent disparity in the selected 17 contributors is replaced with the disparity of that processed pixel.

The selection of these 17 contributors proceeds as follows. The disparity of the processed pixel and the disparity of its four adjacent pixels always contribute to the selection of the most frequent disparity. Four farthest possible Shape locations are pre-computed as a mask. If these locations are activated by Shape, the disparity values of these corner locations and their two adjacent pixels also contribute. Therefore, at most 17 and at least 5 disparities contribute to the refinement process of each pixel.

In FIG. 3, examples of the selection of contributing pixel locations are shown for three different window sizes. Considering the proposed contributor selection scheme, the pixels in the same row with the same window size have identical masks. The masks for the seven rows of a block and three window sizes are different. Therefore, 21 different masks are applied in the refinement process. These masks turn out to simple wiring in hardware.

Median filtering of the selected 17 contributors provides negligible improvement on the DR quality, but it requires high-complexity sorting scheme. The highest frequency selection is used for the refinement process since it can be implemented in hardware with low-complexity equality comparators and accumulators. The maximum number of contributors is fixed to 17 which provides an efficient trade-off between hardware complexity and the disparity estimation quality.

The top-level block diagram of the proposed reconfigurable disparity estimation hardware and the required embedded system components for the realization of the full system are shown in FIG. 4. The Reconfigurable Disparity Map Estimation module involves 5 sub-modules and 62 dual port BRAMs. These five sub-modules are the Control Unit, Reconfigurable Data Allocation, Reconfigurable Computation of Metrics (RCM), Adaptive Disparity Selection (ADS) and Disparity Refinement. 31 of the 62 BRAMs are used to store 31 consecutive rows of the right image, and the remaining 31 BRAMs are used to store 31 rows of the left image. The dual port feature of the BRAMs is exploited to replace processed pixels with the new required pixels during the search process. The proposed hardware is designed to find disparity of the pixels in the left image by searching candidates in the right image. The pixels of the right image are not searched in the left image, and thus cross-check of the DE is not applied.

External memory bandwidth is an important limitation for disparity estimation of HR images. For example, the disparity estimation of a 768×1024 resolution stereo video at 60 fps requires 566 MB/s considering loading and reading each image one time. The ZBT SRAM and DDR2 memories that are mounted on FPGA prototyping boards can typically reach approximately 1 GB/s and 5 GB/s, respectively. However, an algorithm or hardware implementation that requires multiple reads of a pixel from an external memory can easily exceed these bandwidth limitations. Using multiple stereo cameras in future targets or combining different applications in one system may bring external memory bandwidth challenges. The hardware in [15] needs to access external memory at least five times for each pixel. The hardware presented in [19] requires external memory accesses at least seven times for each pixel assuming that the entire data allocation scheme is explained. Our proposed memory organization and data allocation scheme require reading each pixel only one time from the external memory during the search process.

The system timing diagram of the AWDE is presented in FIG. 5. The disparity refinement process is not applied to the pixels that belong to the two blocks at the right and left edges of the left image. For the graphical visualization of the reconfigurable disparity computation process together with the disparity refinement process, the timing diagram is started from the process of a sixth block of the left image. As presented in FIG. 5, efficient pipelining is applied between the disparity refinement and disparity selection processes. Therefore, the disparity refinement process does not affect the overall system throughput but only increases the latency. The system is able to process 49 pixels every 197 clock cycles for a 128 search range. Important timings during the processes are also presented with dashed lines along with their explanations.

The block diagram of the Reconfigurable Data Allocation module is shown in FIG. 6. The data allocation module reads pixels from BRAMs, and depending on the processed rows, it rotates the rows using the Vertical Rotator to maintain the consecutive order. This process is controlled by the Control Unit through the rotate amount signal.

The search process starts with reading the 31×31 size window of searched block from the BRAMs of the left image. Therefore, the Control Unit sends the image select signal to the multiplexers that are shown in FIG. 6 to select the BRAMs of the left image. Moreover, the color select signal provides static configurability to select one of the pixel's components (either Y, Cb or Cr, either R, G or B) during the search process. This user-triggered selection is useful if the Y components of the pixels are not well distributed on the histogram of the captured images. While the window of searched block are loaded to the D flip-flop (DFF) Array, the RCM computes and stores the 49 Census transforms, 49 Shapes and 9 windows pertaining to the pixels in the block for the computation of BW-SAD.

The Census transforms and windows of the candidate pixels in the right image are also needed for the matching process. After loading the pixels for the computation of metrics for the 7×7 block, the Control Unit selects the pixels in the right image by changing the image select signal, and starts to read the pixels in the right image from the highest level of disparity by sending the address signals of the candidate pixels to the BRAMs.

The disparity range can be configured by the user depending on the expected distance to the objects. Configuring the hardware for a low disparity range increases the hardware speed. In contrast, a high disparity range allows the user to find the depth of close objects. The architecture proposed in [19] is not able to provide this configurability since it is designed to search 80 disparity candidates in parallel, instead of providing parallelization to search multiple pixels in the left image. Therefore, a fixed amount of disparities is searched in [19], and changing the disparity range requires a redesign of their hardware.

The detailed block diagram of the DFF Array and the Weaver are shown in FIG. 7. They are the units of the system that provide the configurability of the adaptive window size. As a terminology, we used the term "weaving" to mean "selecting 49 contributor pixels in different window sizes 7×7, 13×13 and 25×25 by skipping 1, 2 and 4 pixels respectively". Seven rows and one column are processed in parallel by the Weaver, and the processed pixels flow inside the DFF Array from the left to the right. Additionally, the weaving process is applied to the location (15, 8) of the DFF Array at the beginning of the search process only, to select the window size by computing the deviation of the center of the block from its neighbors for 7×7 and 13×13 windows.

The DFF Array is a 31×25 array of 8-bit registers shown in FIG. 7. The DFF Array has 25 columns since it always takes the inputs of the largest window size, i.e. 25×25, and it has 31 rows to process seven rows in parallel. While the pixels are shifting to the right, the Weaver is able to select the 49 components of the 7×7, 13×13 and 25×25 window sizes from the DFF Array with simple wiring and multiplexing architecture. Some of the contributor pixels of the windows for different window sizes are shown in FIG. 7 in different colors. The Weaver and DFF Array are controlled by Control Unit through the calculate deviation, window size and shift to right signals. The Weaver sends seven windows to be processed by RCM as process row 1-process row 7, and each process row consists of 49 selected pixels.

A large window size normally involves high amount of pixels and thus requires more hardware resource and computational cost to support the matching process [25]. By using the proposed weaving architecture, even if the window size is changed, always 49 pixels are selected for the window. Therefore, the proposed hardware architecture is able to reach the largest window size (25×25) among the hardware architectures implemented for DE [15]-[21]. The adaptability of window size between the small and large window sizes provides high-quality disparity estimation results for HR images.

During the weaving process of the 49 pixels in the block and the candidate pixels in the right image, the RCM computes the Census and Shape of these pixels in a pipeline architecture. The block diagram of the RCM is shown in FIG. 8. The process for each block starts by computing and storing the Census and Shape results for the 7×7 block. In FIG. 8, the registers are named as "$Shape_{row\_column}$" and "$Census_{row\_column}$". Since the BW-SAD is only applied for 9 of the 49 pixels, the BW-SAD computation sub-modules are only implemented in process rows 2, 4 and 6.

The BW-SAD sub-module in FIG. 8 takes the Shape, registered window of the pixel in a block and the candidate window of the searched pixel as inputs, and provides the BW-SAD result as an output. The computation of the Hamming distance requires significantly less hardware area than the BW-SAD. Therefore, the Hamming computation is used for all of the 49 pixels in a block.

As shown in FIG. 8, when a new candidate Census for the process row 1 is computed by the Census sub-module of the RCM, its Hamming distance with the preliminary computed seven Census1_[1:7] of the block is computed by the seven Hamming sub-modules. The seven resulting Hamming Results of the process row 1 are passed to the ADS module. Since this process also progresses in parallel for seven process rows, the proposed hardware is able to compute the Hamming distances of 49 pixels in a block in parallel. This parallel processing scheme is presented in FIG. 9. While the proposed architecture computes the Hamming distance for the left-most pixels of the block, the Hamming for disparity d, rightmost pixels of the block computes their Hamming for disparity d+6. Therefore, the resulting Hamming costs are delayed in the ADS to synchronize the costs. This delay is also an issue of the BW-SAD results and they are also synchronized in the ADS.

The internal architecture of the Census transform involves 48 subtractors. The Census module subtracts the intensity of center from the 48 neighboring pixels in a window, and uses the sign bit of the subtraction to define 48-bit Census result. The Shape computation module reuses the subtraction results of Census module. The Shape module takes the absolute values of the subtraction results and compares the absolute values with the $threshold_w$. The Hamming computation module applies 48-bit XOR operation and counts the number of 1s with an adder tree.

The Deviation module shown in FIG. 8 only exists on the process row 4 since it is only needed for the center of the 7×7 block to determine the window size. The module accumulates the absolute difference of the 48 neighboring pixels from the center. The Control Unit receives the deviation result of the 7×7 and 13×13 window sizes in consecutive clock cycles and determines window size. The mathematical calculation of the MAD requires dividing the total deviation by 48. In order to remove the complexity of the division hardware, the thresholds $tr_{7\times7}$ and $tr_{13\times13}$ are recomputed by multiplying them with 48 and compared with the resulting absolute deviations.

The use of BW-SAD provides better results than using the SAD in presence of disparity discontinuity [25]. However, if the processed image involves a significant amount of texture without much depth discontinuity, using the SAD provides better results. Especially for 7×7 window size, using SAD instead of BW-SAD provides better visual results since it is the sign of significantly textured region. Thus, dynamic configurability is provided to change the BW-SAD computation metric to the SAD computation for a 7×7 window. The SAD module computes the ADs and the result of ADs are stored in registers prior to accumulation. An active-low reset signal is used at the register of the AD to make its result 0 when the architecture is configured for the BW-SAD and the respective Shape of the pixel in the block is 0. Otherwise, the AD register takes its actual value and participate to the SAD.

The ADS module that is shown in FIG. 4 receives the Hamming results and the BW-SAD results from the RCM and determines the disparity of the searched pixels. Since the BW-SAD results are computed for 9 of the 49 pixels, the RCM linearly interpolates these nine values to find the estimated BW-SAD results of the remaining 40 pixels in the block. Due to an efficient positioning of the nine pixels in a block, the linear interpolation requires a division by 2 and 4, which are implemented as shift operations.

The ADS module shifts the Hamming results of the candidate pixels depending on the 2's order adaptive penalty for the multiplication process as shown in formula (5). The ADS module adds the resulting Hamming penalty on the BW-SADs to compute Hybrid Costs. 49 comparators are used to select 49 disparity results that point minimum Hybrid Costs.

The DR module receives the 49 disparity results from the ADS and the Shapes of the 49 pixels of a block from the RCM and determines the final refined disparity values.

As presented in FIG. 10, after the ADS module has computed 49 disparity values in parallel, it loads this data in to the DFF Array of the DR module (DR-Array). The DR-Array has a size of five blocks for the refinement process. The Control Unit enables the DFFs by using the Load Disparity signal when the 49 disparity outputs of ADS module are ready for the refinement process. In each cell of the DR-Array, the respective Shape of a pixel is loaded from the RCM using the Load Shape signal. DR-Array is designed to shift the disparity and Shape values from right to left to allocate data for the refinement processes.

The DR hardware involves a Highest Frequency Selection (HFS) module that consists of seven identical Processing Elements (DR-PE). As presented in FIG. 10, DR-PEs are positioned to refine seven disparities in 15th column of DR-Array in parallel while the disparity and Shape values shift through the DR-Array. The hardware architecture of a single DR-PE is presented in FIG. 11. The location of a single DR-PE is shown in the 6th row of the DR-Array with bold square.

In FIG. 10, while 17 disparity values are selected by the multiplexers, the Shape information corresponding to the four corners are also selected from the 49-bit Shape information of the processed pixel. The selected 4-bits inform the DR-PE which of these 12 disparity values on the corners will be used while computing the highest frequency disparity. These 4 bits of the Shape are called activation bits in FIG. 11. Each activation bit activates itself together with its two adjacent disparities. Since the center disparity and its four neighbors are always activated, the 17-bit activation information is loaded to the DR-PE together with the respective disparities.

As presented in FIG. 11, the DR-PE hardware consists of two parts: Comparison of Disparities and Comparison of Frequencies. In the Comparison of Disparities part, the 17-bit activation information and the 17 disparities are stored in to two DFF Arrays. One of these DFF Arrays is used as a reference and the other one rotates to compare each disparity with the 16 other disparities. During the rotation process, 17 Compare and Accumulate (C&A) sub-modules compare the disparities in parallel. If the compared disparities are identical and both of them are activated, the values of the accumulators are increased by one. After 17 clock cycles, the values in the accumulators and their respective disparities are loaded in to the DFF Array in the Comparison of Frequencies part of the DR-PE. In the pipeline architecture, at the same time, the Control Unit shifts the DR-Array to the left by one to load new 17 contributors to the DR-PE. The Compare and Select (C&S) sub-module compares the values of the accumulators to find the highest value in the accumulators, and selects the disparity with the highest frequency as refined disparity. Since DR process works in parallel with other hardware modules of AWDE, it does not affect the throughput of the DE system if disparity range is configured as more than 70.

The intuition behind the proposed Iterative Refinement process of the IR-AWDE algorithm is identical to the DR process presented in FIG. 10: neighboring pixels within the same Shape need to have an identical disparity value, since they may belong to one unique object. Using the refinement process multiple times removes noisy computations more efficiently, and increases the disparity estimation quality.

The iterative refinement hardware is presented in FIG. 12 which consists of an improved version of the DR hardware presented in FIG. 10. The proposed Iterative Refinement process utilizes three concatenated Highest Frequency Selection modules. Each HFS module comprises seven identical DR-PEs, one of which is presented in FIG. 11. All DR-PEs receive 17 selected disparities from their own multiplexer. DR-Array in FIG. 10 includes DFFs to keep record of the computed disparities for five blocks. Instead, for the IR, the size of the DFF-Array is increased to six blocks since the disparities need to be pipelined for longer duration. Moreover, DR hardware presented in FIG. 10 provides most frequent disparities as an output as the refined disparities. Instead, the HFS modules for the IR hardware write back the refined disparities on DR-Array. Writing back the most frequent disparities into the DR-Array provides an iterative refinement of the estimated disparities. Since the disparity results shift inside the DR-Array, refined disparities are overwritten 2 pixels left of the consecutive pixel location. For example, as presented in FIG. 12, while the HFS module refines the disparities of the seven pixels in column 21 of the DR-Array, the DR-Array shifts the disparity values 2 times. Therefore, the computed seven highest frequency disparities in the column 19 of the DR-Array are overwritten.

In addition to removing noisy computations, IR provides efficient results in assigning disparities of occluded regions. While searching pixels from the left image inside the right image, occluded regions appear on the left side of objects [11]. Consequently, wrong computations due to occlusion appear on the left sides of the objects in the image, which should be replaced by the correct disparities that are assigned to the left adjacent pixels of the occluded ones. The proposed iterative refinement process scans the estimated disparities from left to right. In addition, HFS modules receive updated disparities from their left since they are already overwritten by the refined ones. Therefore, this process iteratively spreads the correct disparities to the occluded regions while considering the object boundaries with the Shape information. While disparities shift inside the DR-Array, the leftmost disparities in the column 0 of the DR-Array are provided as the refined disparity value outputs of the IR Module.

The reconfigurable hardware architecture of the proposed AWDE algorithm is implemented using Verilog HDL, and verified using Modelsim 6.6c. The Verilog RTL models are mapped to a Virtex-5 XCUVP-110T FPGA comprising 69 k Look-Up Tables (LUT), 69 k DFFs and 144 Block RAMs (BRAM). The proposed hardware consumes 59% of the LUTs, 51% of the DFF resources and 42% of the BRAM resources of the Virtex-5 FPGA. The proposed hardware operates at 190 MHz after place & route and computes the disparities of 49 pixels in 197 clock cycles for 128 pixel disparity range. Therefore, it can process 60 fps at a 768×1024 XGA video resolution.

The AWDE-IR is implemented to further improve the disparity estimation quality of AWDE using an efficient iterative refinement step. The hardware implementation of AWDE-IR is mapped to a same FPGA and verified using Modelsim 6.6c. The proposed AWDE-IR hardware consumes 70% of the LUTs, 63% of the DFF resources and 42% of the BRAM resources of the Virtex-5 FPGA. It can work at same speed performance due to the pipeline structure of the refinement process.

The parameters of the AWDE algorithm are shown in Table 1. Parameters are selected by sweeping to obtain high quality DE of HR images considering different features pertaining to the image content.

Table 2 and Table 3 compare the disparity estimation performance and hardware implementation results of the AWDE architecture with other existing hardware implementations that targets HR [19]-[21] and currently the highest quality DE hardware that targets LR [15]. The DE results for the Census and the BW-SAD metrics for different window sizes are also presented in Table 2. The comparisons of the resulting disparities with the ground-truths are done as prescribed by the Middlebury evaluation module. If the estimated disparity value is not within a ±1 range of the ground truth, the disparity estimation of the respective pixel is considered erroneous. 18 pixels located on the borders are neglected in the evaluation of LR benchmarks Tsukuba and Venus, and a disparity range of 30 is applied for all algorithms. 30 pixels located on the borders are neglected in the evaluation of HR benchmarks Aloe, Art and Clothes, and a disparity range of 120 is applied for all algorithms.

The Census and BW-SAD results that are shown in Table 2 are provided by sampling 49 pixels in a window. FW-DE indicates the combination of BW-SAD and Census for a fixed window size. The numbers terminating the name of the algorithms indicate the fixed window sizes of these algorithms.

Although the Census and the BW-SAD algorithms do not individually provide very efficient results, the combination of these algorithms into the FW-DE provides an efficient hybrid solution as presented in Table 2. For example, if a 7×7 window size and Census method are exclusively used for DE on the HR benchmark Art, 45.39% erroneous DE computation is observed from the result of Census7. Exclusively using a 7×7 window size and BW-SAD method for the same image yields 34.03% erroneous computation. However, if only a 7×7 window size is used combining the Census and BW-SAD methods, 20.87% erroneous computation is observed as presented in the result of FW-DE7. 20.87% erroneous computation is significantly smaller than 45.39% and 34.03%, which justifies the importance of combining the Census and BW-SAD in to a hybrid solution. For the same image, using the FW-DE13 and FW-DE25 algorithms yields 16.97% and 18.12% erroneous DE computations, respectively. Combining the FW-DE7, FW-DE13 and FW-DE25 into a reconfigurable hardware with an adaptive window size feature further improves the algorithm results as demonstrated from the results of AWDE. AWDE provides 16.33% erroneous computation for the same image which is smaller than 20.87%, 16.97% and 18.12%, thus numerically emphasizing the importance of adaptive window size selection. The algorithmic performance of AWDE, 16.33%, is considerably better than the DE performance results of HR DE hardware implementations [20], [21] and [19] that provide 32.18%, 23.46% and 23.75% erroneous computations respectively for the same image.

If the sampling of 49 pixels in a window is not applied and all the pixels in a window are used during the matching process, the complexity of the AWDE algorithm increases by 12 times. The result of the high complexity version of the AWDE algorithm (AWDE-HC) is also provided in Table 2 for comparison. The AWDE-HC provides almost the same quality results as the AWDE. Considering the hardware overhead of AWDE-HC, the low complexity version of the algorithm, AWDE, is selected for hardware implementation, and its efficient reconfigurable hardware is presented.

Improving the results of AWDE is possible using the low complexity iterative refinement step as indicated from the results of AWDE-IR. AWDE-IR efficiently removes a significant amount of noisy computations by iteratively replacing the disparity estimations with the most frequent neighboring ones as can be observed from the results of Tsukuba, Venus, Aloe and Art. Moreover, IR does not require significant amount of additional computational complexity. Therefore, AWDE-IR is implemented in hardware for the further improvement of the disparity estimation quality.

The algorithm presented in [15] uses the Census algorithm with the cost aggregation method, and provides the best results for both LR and HR stereo images except the HR benchmark Clothes. As shown in Table 3, due to the high-complexity of cost aggregation, it only reaches 42 fps for CIF images, thereby consuming a large amount of hardware resource. If the performance of [15] is scaled to 1024×768 for a disparity range of 128, less than 3 fps can be achieved.

None of the compared algorithms that have a real-time HR hardware implementation [19]-[21] is able to exceed the DE quality of AWDE and AWDE-IR for HR images. The overall best results following the results of AWDE and AWDE-IR are obtained from [21]. The hardware presented in [21] consumes 20% of the 270 k Adaptive LUT (ALUT) resources of a Stratix-III. It provides high disparity range due to its hierarchical structure. However, this structure easily causes faulty computations when the disparity selection finds wrong matches in low resolution.

The hardware implementation of [19] provides the highest speed performance in our comparison. However this hardware applies 480 SAD computations for a 7×7 window in parallel. The hardware presented in [19] consumes %60 of the 244 k ALUT resources of a Stratix-IV FPGA. In our hardware implementation we only use 9 SAD computations in parallel for the same size window and this module consumes 16% of the resources of Virtex-5 FPGA on its own. Therefore, the hardware proposed in [19] may not fit in to 3 Virtex-5 FPGAs.

The visual results of the AWDE and AWDE-IR algorithms for the HR benchmarks Clothes, Art and Aloe are shown in FIG. 13 (*a-l*). The disparity map result of the AWDE algorithm for the 1024×768 resolution pictures taken by our stereo camera system is shown in FIG. 13 (*m-o*). Our hardware architectures provide both quantitative and visual satisfactory results and reaches real-time for HR.

As a conclusion, in this patent, a hardware-oriented adaptive window size disparity estimation algorithm, AWDE, and its real-time reconfigurable hardware implementation are presented. The proposed AWDE algorithm dynamically adapts the window size considering the local texture of the image to increase the disparity estimation quality. In addition, an enhanced version of the AWDE, AWDE-IR, is presented. AWDE-IR iteratively refines disparity estimations to remove the noisy computations of AWDE. Currently, the AWDE and AWDE-IR algorithms and their real-time hardware implementation reach higher DE quality than the existing real-time DE hardware implementations for HR images. The proposed reconfigurable hardware architectures of AWDE and AWDE-IR can process 60 fps at a 1024×768 XGA video resolution for 128 pixel disparity range. The AWDE and AWDE-IR algorithms and their reconfigurable hardware can be used in consumer electronic products where high-quality real-time disparity estimation is needed for HR video.

REFERENCES CITED

Paper Publications

[1] F. Tombari, S. Mattoccia, L. Di Stefano, Stereo for robots: quantitative evaluation of efficient and low-memory dense stereo algorithms, in: Proc. Int. Conf. Control Automation Robotics and Vision, IEEE Computer Society, December 2010, pp. 1231-1238.

[2] S. Yang, G. Huang, Z. Zhao, N. Wang, Extraction of Topographic Map Elements with SAR Stereoscopic Measurement, IEEE International Symposiom on Image and Data Fusion, August 2011.

[3] P. M, Cheung and K. T. Woo, Human tracking in crowded environment with stereo cameras, 17th International Conference on Digital System Processing, July 2011, pp. 1-6.

[4] M. Field, D. Clarke, S. Strup, M D, W. B. Seales, Stereo Endoscopy as a 3-D Measurement Tool, in: Proceedings of the 31st Annual International Conference of the IEEE Engineering in Medicine and Biology Society 2009, September 2009, pp. 5748-5751.

[5] G. Yahav, G. J. Iddan, D. Mandelboum, 3D imaging camera for gaming application, in: Proc. Int. Conf. on Consumer Electronics (ICCE), January 2007, pp. 1-2.

[6] M. Grosse, J. Buehl, H. Babovsky, A. Kiessling, R. Kowarschik, 3D shape measurement of macroscopic objects in digital off-axis holography using structured illumination, Optics Letters, vol. 35, April 2010, pp. 1233-1235.

[7] Dongbo Min, Donghyun Kim, SangUn Yun, Kwanghoon Sohn, 2D/3D freeview video generation for 3DTV system, Elsevier Journal on Signal Processing: Image Communication, Volume 24, Issues 1-2, January 2009, Pages 31-48

[8] P. Merkle, Y. Morvan, A. Smolic, D. Farin, K. Müller, P. H. N. de With, T. Wiegand, The effects of multiview depth video compression on multiview rendering, Elsevier Journal on Signal Processing: Image Communication, Volume 24, Issues 1-2, January 2009.

[9] Y. Mori, N. Fukushima, T. Yendo, T. Fujii, M. Tanimoto, View generation with 3D warping using depth information for FTV, Elsevier Journal on Signal Processing: Image Communication, Volume 24, Issues 1-2, January 2009, Pages 65-72.

[10] C. Lee, H. Song, B. Choi, Y. S. Ho, 3D scene capturing using stereoscopic cameras and a time-of-flight camera, IEEE Trans. Consumer Electron., vol. 57, no. 3, August 2011, pp. 1370-1376

[11] D. Scharstein and R. Szeliski, A Taxonomy and evaluation of dense two-frame stereo correspondence algorithms, Int. J. Comput. Vision, vol. 47, nos. 1-3, April 2002, pp. 7-42.

[12] X. Mei, X. Sun, M. Zhou, S. Jiao, H. Wang, X. Zhang, On building an accurate stereo matching system on graphics hardware, in: Proc. of GPUCV, November 2011.

[13] Z. Wang and Z. Zheng, A region-based stereo matching algorithm using cooperative optimization, in: Proc. IEEE Conf. Comput. Vision Pattern Recognition, June 2008.

[14] A. Klaus, M. Sormann, and K. Kamer, Segment-based stereo matching using belief propagation and a self-adapting dissimilarity measure, in: Proc. ICPR, vol. 3, 2006.

[15] N.-C. Chang, T.-H. Tsai, B.-H. Hsu, Y.-C. Chen, and T.-S. Chang, Algorithm and Architecture of Disparity Estimation With Mini-Census Adaptive Support Weight, IEEE Transaction on Circuits and Systems for Video Technology, vol. 20, no. 6, June 2010, pp. 792-805.

[16] Y. Miyajima, T. Maruyama, A Real-Time Stereo Vision System with FPGA, in: Proceedings of the 30th Conference of IEEE Industrial Electronics Society, 2003.

[17] S. Jin, J. Cho, X. D. Pham, K. M. Lee, S-K. Park, M. Kim, and J. W. Jeon, FPGA Design and Implementation of a Real-Time Stereo Vision System, IEEE Trans. on CSVT, January 2010, pp. 15-26.

[18] Sang Hwa Lee and Siddharth Sharma, Real-Time Disparity Estimation Algorithm For Stereo Camera Systems, IEEE Transactions on Consumer Electronics, vol. 57, no. 3, August 2011.

[19] C. Georgoulas and I. Andreadis, A Real-Time Occlusion Aware Hardware Structure for Disparity Map Computation, Image Analysis and Process. ICIAP, 2009, pp. 721-730

[20] C. Ttofis, S. Hadjitheophanous, A. S. Georghiades, T. Theocharides, Edge-directed hardware architecture for realtime disparity map computation, in: Proceedings of the IEEE Transactions on Computers, January 2012.

[21] P. Greisen, S. Heinzle, M. Gross, A. P. Burg, An FPGA-based Processing Pipeline for High-Definition Stereo Video, EURASIP Journal on Image and Video Processing, vol. 2011, November 2011, pp. 18.

[22] R. Zabih, J. Woodfill, Non-parametric local transforms for computing visual correspondence, in: Proc. 3rd Eur. Conf. Comput. Vision, vol. 2, 1994, pp. 151-158

[23] A. Akin, I. Baz, B. Atakan, I. Boybat, A. Schmid, Y. Leblebici, A hardware-oriented dynamically adaptive disparity estimation algorithm and its real-time hardware, in: Proc. of GLSVLSI Conf., Paris, France, 2-3 May. 2013.

[24] A. Akin, I. Baz, A. Schmid and Y. Leblebici. Dynamically adaptive real-time disparity estimation hardware using iterative refinement, in Integration, the VLSI Journal, 2013.

[25] A. Motten, L. Claesen, A Binary Adaptable Window SoC Architecture for a Stereo Based Depth Field Processor, in: Proceedings IEEE VLSISOC-2010, 18th IEEE/IFIP International Conference on VLSI and System-on-Chip, September 2010, pp. 25-30.

[26] T. Kanade, and O. Masatoshi. A stereo matching algorithm with an adaptive window: Theory and experiment, Pattern Analysis and Machine Intelligence, IEEE Transactions on 16.9 (1994): 920-932.

Patent Documents

[27] Data Processing System and Method, International Patent Classification: G06F 1/00, International Publication Number WO 98/47061.

An efficient approach to estimate disparity map, International Patent Classification G06T 7/00, International Publication Number WO 2012/177166 A1.

The invention claimed is:

1. A real-time stereo camera disparity estimation device comprising:
   an input device arranged to input measured data corresponding to rows of left and right images;
   a memory device arranged to buffer the input measured data;
   a processor for rotating data to align the rows of left and right images in a same column;

a processor for data allocation to create variable window sizes to adapt a window size based on a local texture on the left and right images;

a processor for metrics calculation to compute stereo matching costs for disparities between the left and right images within a block within the adapted window size within a block within the adapted window size; and a processor for adaptive disparity selection configured to select disparity values with minimum matching costs from the stereo matching costs as disparity results.

2. The device of claim 1, further comprising:

a processor for an iterative disparity refinement configured to iteratively refine the disparity values of the disparity results of the processor for adaptive disparity selection.

3. The device of claim 1, wherein the processor for data allocation is further configured to create variable window sizes to adapt the window size to a local texture on the at least one of left and right image.

4. The device of claim 1, wherein the processor for metrics calculation comprises:

a plurality of processing devices for multiple processed pixels in a two dimensional block to compute their stereo matching costs for candidate disparities in parallel.

5. The device of claim 1, wherein the memory device comprises:

dual-ports configured to write and read concurrently;

a connection of read address ports to a same read address request of the processors to allow the processors to read multiple rows and a same column of the image in parallel, the memory device configured to store YCbCr or RGB data for the pixels.

6. The device of claim 5, wherein pixels of different rows are stored in separate block RAMs of the memory device to be able to access multiple pixels in the same column in parallel.

7. The device of claim 6, wherein the data in the block RAMs are overwritten by new rows of at least one of the left and right image after they are processed by at least one of the processors.

8. The device of claim 1, wherein the processor for rotating data is further configured to rotate either Y, Cb or Cr, either R, G or B to make disparity estimation in any of the selected pixel data channel, and to rotate and align either left image pixels or right image pixels.

9. The device of claim 3, wherein the processor for data allocation to create variable window sizes comprises, a flip-flop array configured to store and shift aligned outputs of the processor for rotating data;

wires connected to the flip-flops array arranged to sample the pixels while pixels are flowing inside the flip-flops array;

a plurality of first sampling schemes to provide the variable window sizes;

a plurality of second sampling schemes to provide constant number of contributing pixels in the variable window sizes to provide constant computational load for the variable window sizes; and a plurality of multiplexers configured to select windows to a selected window size to be used in disparity estimation process of multiple pixels in a block according to the selected window size.

10. The device of claim 9, wherein the selection of window size is determined depending on a variance of neighboring pixels for variable window sizes.

11. The device of claim 9, wherein a same one of the selected window size is applied to multiple searched pixels in a block.

12. The device of claim 9, wherein for every searched block of pixels, window size is dynamically re-determined.

13. The device of claim 4, wherein the plurality of processing devices are configured for a computation of metrics and comprises, a plurality of census, Hamming, SAD and BW-SAD cost computation devices for concurrent and independent disparity search of multiple pixels in the two dimensional block; and a selection device configured for a configurability through selection either of SAD or BW-SAD cost computations.

14. The device of claim 13, wherein the plurality of processing devices are configured to perform:

SAD and BW-SAD computations for sampled pixels in a searched block to reduce an overall computational complexity;

interpolation of SAD and BW-SAD values of the sampled pixels in the block to compute and estimate the SAD and BW-SAD values of all the remaining pixels in the searched block for which SAD and BW-SAD are not computed; and Hamming computations for all the pixels in the searched block.

15. The device of claim 13, wherein the processor for disparity selection comprises:

a multiplier to normalize a hamming cost using adaptive penalties; and an adder for adding multiplied hamming value with SAD result to compute hybrid cost.

16. The device of claim 15, wherein the adaptive penalties are in an order of two to simplify an implementation of multipliers with shifters.

17. The device of claim 15, wherein small penalty values are used for small window size, and big penalty values are used for big window size.

18. The device of claim 2, wherein the processor for iterative disparity refinement to refine the disparity values comprises:

a flip-flop array to store and shift the disparity results; and a highest frequency selection device configured to determine most frequent disparity values to replace processed disparity values with the most frequent ones to establish the disparity results.

19. The device of claim 18, wherein the highest frequency selection hardware device is configured to determine the most frequent disparity values and refine the disparities using the color similarity of neighboring pixels.

20. The device of claim 18, wherein multiple rows are refined in parallel using a plurality of highest frequency selection devices to determine the most frequent disparity values.

21. The device of claim 18, wherein the disparity results are iteratively refined.

22. The device of claim 18, wherein the disparity results are iteratively refined by processing multiple consecutive columns using a plurality of highest frequency selection devices.

23. The device of claim 18, wherein the refined disparity values are written back to the flip flop array to iteratively use refined disparity values for further refinements.

24. The device of claim 18, wherein final shifted disparity values at an end of the flip flop array are used as the output of the disparity estimation device.

* * * * *